Figure 1:
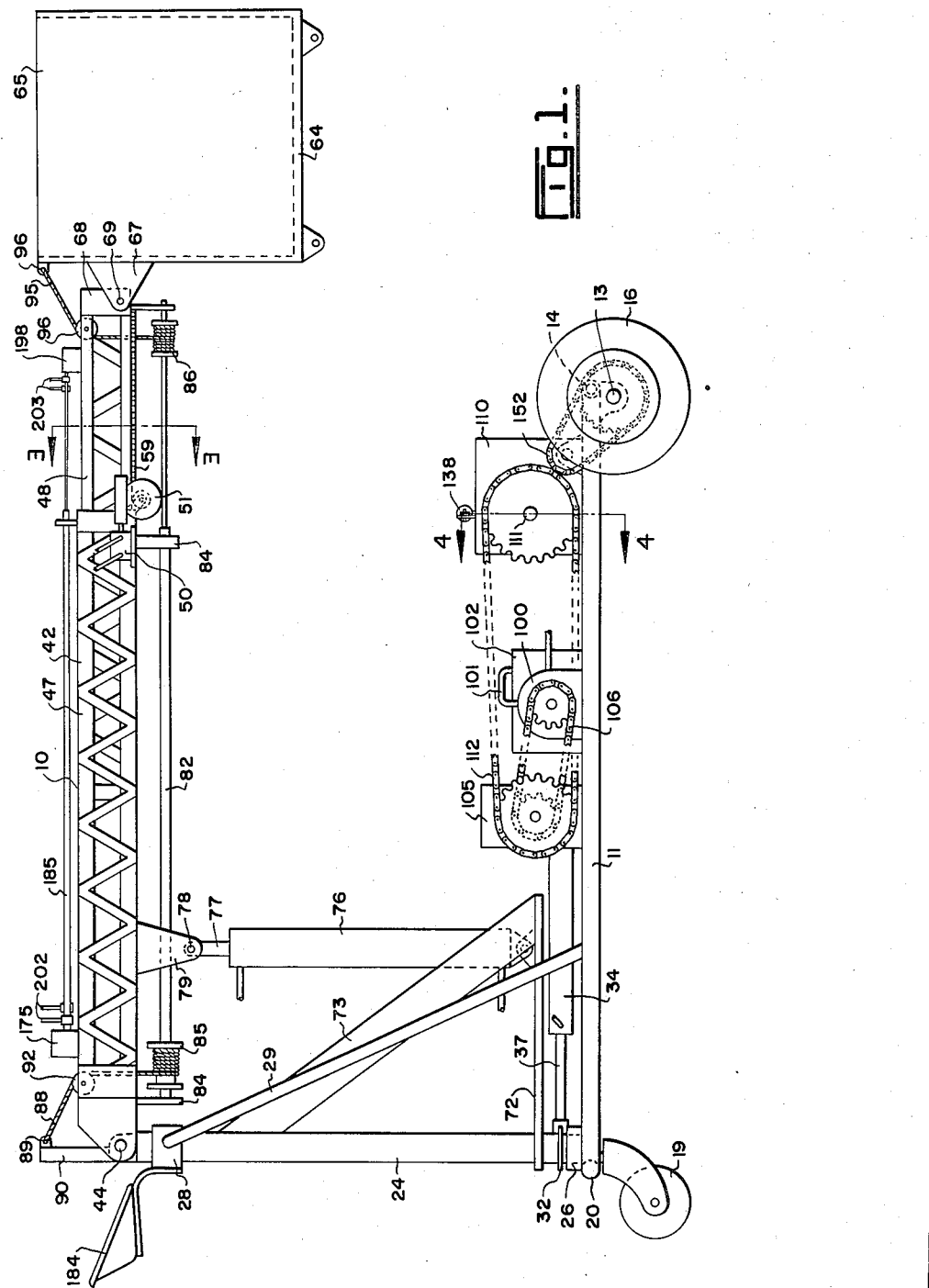

Jan. 31, 1961  J. E. GRANT  2,969,849
ORCHARD VEHICLE
Filed Jan. 7, 1957  4 Sheets-Sheet 1

INVENTOR
JOHN E. GRANT
BY
Fetherstonhaugh & Co.
ATTORNEYS

Jan. 31, 1961  J. E. GRANT  2,969,849
ORCHARD VEHICLE
Filed Jan. 7, 1957  4 Sheets-Sheet 3

INVENTOR
JOHN E. GRANT
BY
Fetherstonhaugh & Co.
ATTORNEYS

Jan. 31, 1961  J. E. GRANT  2,969,849
ORCHARD VEHICLE
Filed Jan. 7, 1957  4 Sheets-Sheet 4
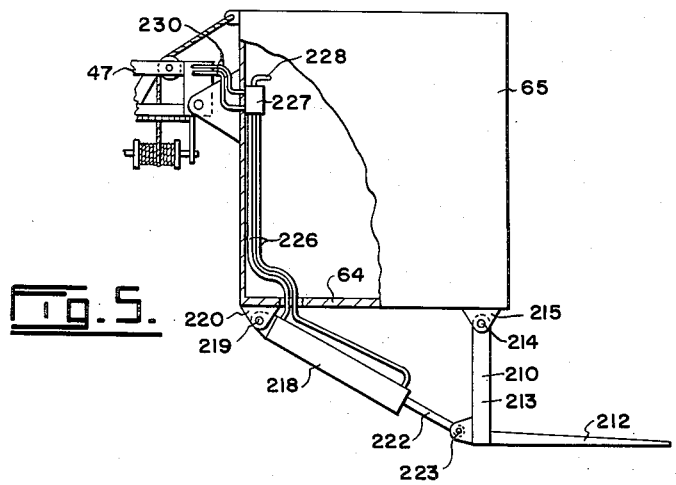
INVENTOR
JOHN E. GRANT
BY
Fetherstonhaugh & Co.
ATTORNEYS ated Jan. 31, 1961

United States Patent Office

2,969,849
ORCHARD VEHICLE

John E. Grant, 549 Hastings Ave., Penticton, British Columbia, Canada

Filed Jan. 7, 1957, Ser. No. 632,804

4 Claims. (Cl. 182—2)

This invention relates to a vehicle for use in orchards to enable one or more men to work on the trees at different levels, although it may be used for other purposes as well.

An object of the present invention is the provision of an orchard vehicle by means of which a man may work on a tree, and which will permit him to change his position and height relative to the tree without leaving his position and without the necessity of another operator.

At the present time men working in orchards either have to climb up and down ladders in order to work on the trees, such as when pruning them, or they stand on trucks, tractors or other platforms for this purpose. This means that it is necessary to have another person driving the vehicle, or the operator has to leave his working position to drive the vehicle every time he wants to move from one position to another relative to a tree or from one tree to another. Furthermore, this does not permit him to get at the tree at heights beyond his normal reach from the base on which he is standing.

The present orchard vehicle includes a substantially horizontal boom having a platform on one end thereof upon which one or more persons may stand. Suitable means is provided for swinging the boom both in a substantially horizontal plane and up and down in a vertical plane, the platform being maintained substantially horizontal during this movement. It is preferable to make the orchard vehicle self-propelled. The controls for swinging and raising the boom and for moving the vehicle are preferably located at or near the platform so that the operator on the platform has full control of the boom and vehicle. The boom is preferably made extensible, and the control for extending and extracting the boom is also located near or at the platform.

An orchard vehicle according to the present invention comprises a base on wheels, a vertical post rotatably mounted on the base near an end thereof, means on the base and connected to the post to rotate the latter about its vertical axis, a boom pivotally mounted at its inner end on the post for vertical movement and normally extending over the base, a support carried by the post and extending under the boom, means on the support and connected to the boom for swinging said boom up and down, a platform pivotally mounted on the outer end of the boom, and means connected to the platform for maintaining it in a substantially horizontal plane when the boom is swung vertically.

Figure 2:
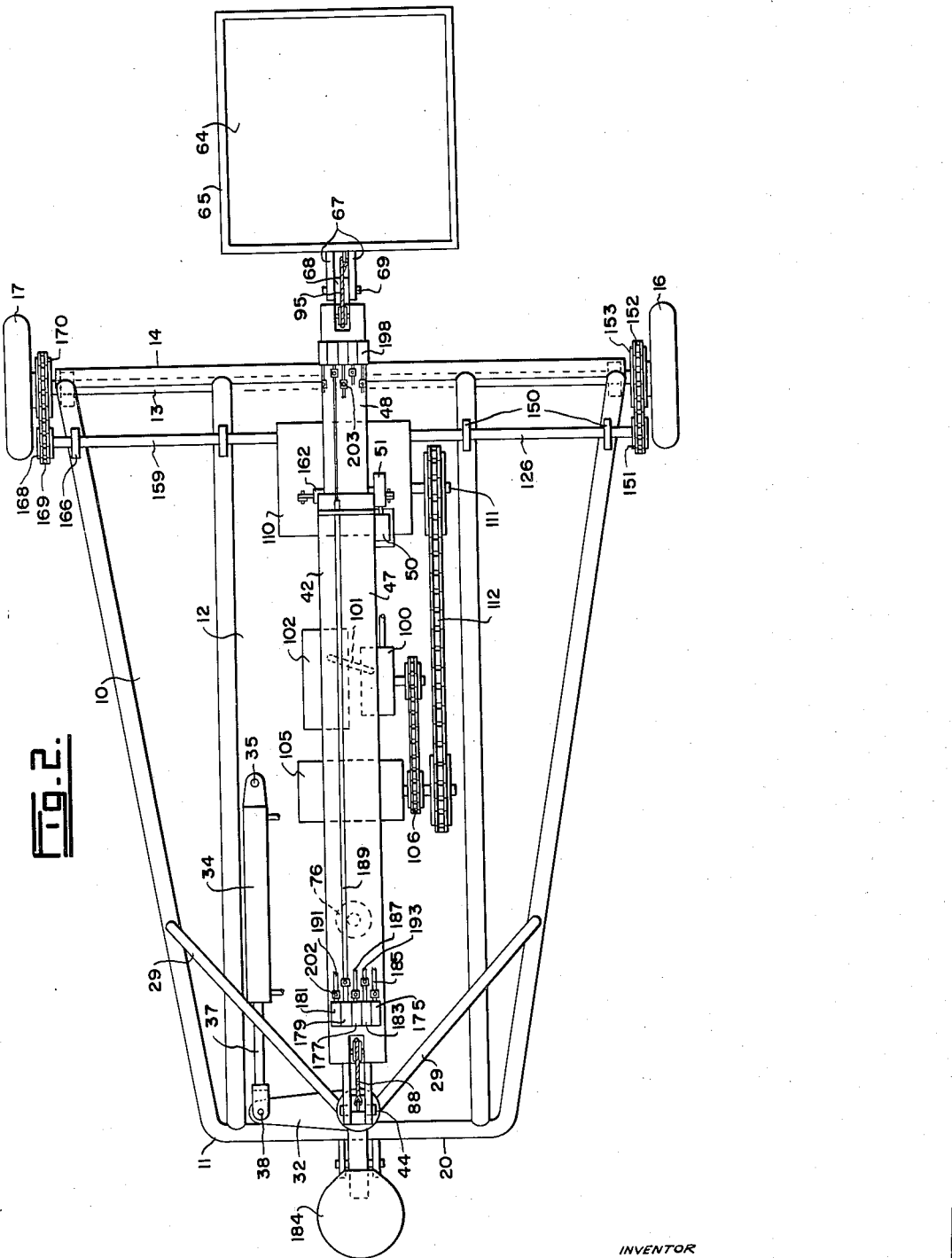
Figure 3:
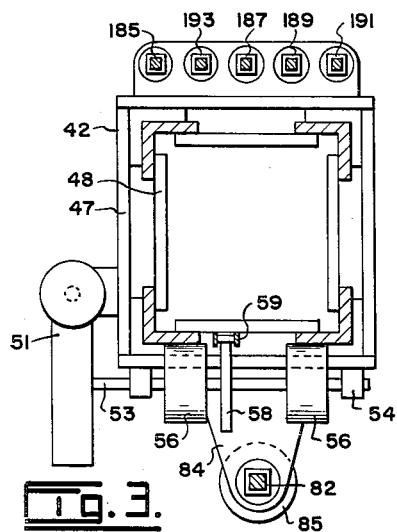
Figure 6:
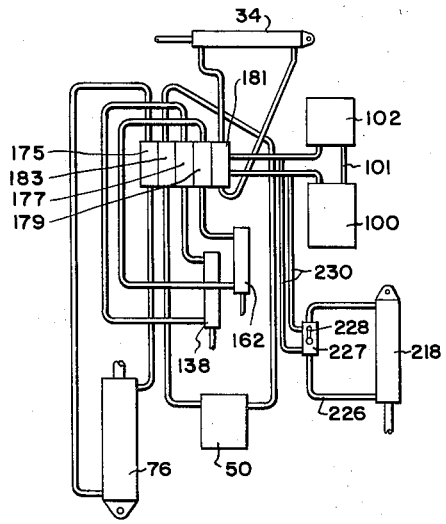
Figure 4:
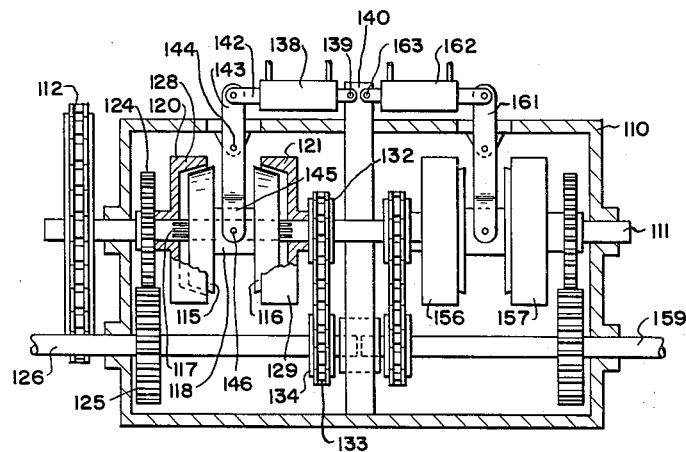

An example of this invention is illustrated in the accompanying drawings, in which, Figure 1 is a side elevation of the orchard vehicle, Figure 2 is a plan view thereof, Figure 3 is an enlarged cross section through the boom taken on the line 3—3 of Figure 1, Figure 4 is an enlarged sectional view taken on the line 4—4 of Figure 1, Figure 5 is a side elevation of the outer end of the boom and the platform, illustrating a fork attachment mounted on the latter, and Figure 6 is a diagram of the hydraulic system of the illustrated vehicle.

Referring to the drawings, 10 is an orchard vehicle. This vehicle may be moved by a tractor, truck or the like, but it is preferably self-propelled. The vehicle includes a base 11 which may be of any desired construction, but is preferably of tubular construction as clearly shown in Figure 2, in which case it has a solid central section 12 extending longitudinally thereof. An axle 13 is carried by the base and extends across the end 14 thereof, and wheels 16 and 17 are rotatably mounted on the ends of this axle. A caster wheel 19 is connected to the opposite end 20 of the base at approximately the middle of said end.

A vertical post 24 is rotatably mounted on base 11 near the end 20 thereof and preferably over the caster wheel 19. The lower end of the post is rotatably mounted in a bearing 26 carried by the base, while its upper end is rotatable in another bearing 28 held in place by braces 29 which extend downwardly and forwardly from said bearing to the sides of the base, as shown in Figures 1 and 2.

Suitable means is provided for rotating post 24 around its vertical axis. In this example, an arm 32 projects laterally from the post near the lower end thereof, see Figure 2, and a hydraulic cylinder 34 mounted on base 11 in a substantially horizontal plane extends towards said arm. The end of this cylinder is pivotally mounted on the base at 35, and a ram 37 projecting from the opposite end of the cylinder is connected to arm 32 at 38. Cylinder 34 is operated to extend and retract ram 37 to rotate post 24 around its vertical axis.

A boom 42 is pivotally mounted at its inner end by a pivot 44 on the upper end of post 24 for vertical movement, said boom normally extending over base 11.

Boom 42 is preferably extensible and may be of any desired construction. In this case, the boom has an outer section 47, and an inner section 48 which is slidably mounted in and projects from the outer end of the outer section. Suitable means is provided for extending and retracting the boom. This may be accomplished by means of a hydraulic motor 50 mounted on the side of boom section 47. The motor rotates a worm drive and worm gear arrangement indicated at 51. This arrangement, in turn, rotates a shaft 53 journalled in bearings 54 depending from boom section 47. Rollers 56 are mounted on this shaft, and the outer end of boom section 48 rides on these rollers, see Figure 3. A sprocket 58 is also mounted on shaft 53, and its teeth engage a chain 59 carried by and extending longitudinally of section 48 along the lower surface thereof. Motor 50 may be operated to turn shaft 53 in either direction to move boom section 48 in or out of section 47.

A platform 64 of any desired construction is pivotally mounted on the outer end of boom 42. As it is intended that one or more persons may stand on this platform, it is preferable to provide it with a confining wall 65 around the edges thereof, said wall forming part of the platform. One way of mounting the platform on the boom is to provide spaced lugs 67 projecting laterally from the wall of the platform below the top thereof, said lugs embracing a projection 68 on the outer end of boom section 48 and being connected thereto by means of a pin 69. This allows the platform to be swung up and down relative to the boom.

A horizontal support 72 is carried by post 24 just above base 11 and extending under boom 42. One end of this support is secured to the post, while its opposite end is carried by a brace 73 which extends upwardly from said end and is secured to the post below upper bearing 28 thereof, see Figure 1. Suitable means is provided on this support for swinging boom 42 up and down.

In this example, a hydraulic cylinder 76 is mounted on and projects upwardly from support 72, and has a ram 77 projecting from its upper end pivotally connected by a pin 78 to a lug 79 projecting downwardly from boom section 47 spaced a little from the pivot 44 thereof. This cylinder may be operated to extend and retract the ram in order to swing the boom vertically.

It is desirable to keep platform 64 substantially horizontal during the up and down swinging movement of boom 42. One way of doing this is to provide an extensible shaft 82 extending the length of the boom beneath its lower surface, said shaft being journalled in bearings 84 carried by the boom sections. As the two sections of this shaft have to rotate together, they may be made square in cross section for this purpose, as shown in Figure 3. Drums 85 and 86 are fixedly mounted on this shaft adjacent opposite ends thereof. A cable 88 is anchored at 89 to a projection 90 extending upwardly from the upper end of post 24. This cable extends downwardly over a pulley 92 mounted on inner boom section 47, and is wound on drum 85. Similarly, another cable 95 is anchored at 96 to the side wall of platform 64 above the boom and extends downwardly over a pulley 96 mounted on the outer boom section 48. This cable is wound on drum 86.

When boom 42 is in its normal horizontal position, as shown in Figure 1, platform 64 is parallel therewith. When the boom is swung upwardly the tension on cable 88 tends to slacken, thereby permitting the platform to remain substantially horizontal during this movement. The weight of the platform pulls cable 95 upwardly to cause shaft 82 to rotate and take up the slack of cable 88. When the boom is lowered, this process is reversed so that the platform still maintains its horizontal position. As shaft 82 is extensible, it extends and retracts when the boom is subjected to the same action.

Cylinders 34 and 76, and motor 50 form part of a hydraulic system. The hydraulic connections of these elements have been omitted from Figures 1 and 2, but they are diagrammatically illustrated in Figure 6 which will hereinafter be explained.

The hydraulic system includes a pump 100 mounted on base 11, this pump drawing fluid through pipe 101 from a reservoir 102 also mounted on the base. A suitable source of power is provided for operating the pump. In this example, an internal combustion engine diagrammatically illustrated at 105 is operatively connected by a sprocket and chain arrangement 106 to the motor. It is to be understood that the fuel supply and all other necessary elements are supplied for this engine, although not shown in the drawings. The controls for the hydraulic motor and cylinders will be described later.

As previously stated, this vehicle is preferably self-propelled, and it is also preferable to be able to drive each of the wheels 16 and 17 independently of the other.

One form of driving connection between engine 105 and wheels 16 and 17 is illustrated in detail in Figure 4, and it is in the form of a transmission 110. This transmission has a drive shaft 111 which is connected to the drive shaft of the motor by a chain and sprocket arrangement illustrated at 112. A pair of inner clutch cones 115 and 116 are slidably mounted on shaft 111 for rotation therewith in any convenient way, such as by means of splines 117. These cones are connected together by a sleeve 118. Cone 115 is movable into and out of engagement with an outer clutch plate 120, while cone 116 is movable out of and into engagement with an outer clutch plate 121, both of said plates being freely mounted on the shaft. Plate 120 is connected to a gear 124 rotatably mounted on shaft 111, said gear meshing with another gear 125 fixedly mounted on a shaft 126 which extends out of the transmission to a point near wheel 16, see Figure 2. Cone 118 and plate 120 form a friction clutch 128, and cone 116 and plate 121 form a friction clutch 129. When one clutch is engaged, the other is disengaged, and vice versa. Plate 121 is connected to a sprocket 132 freely mounted on shaft 111, and the latter sprocket is connected by chain 133 to another sprocket 134 fixedly mounted on shaft 126. When clutch 128 is engaged, shaft 126 is turned in one direction by gears 124 and 125, and when clutch 129 is engaged, said shaft is turned in the opposite direction by sprockets 132—134 and chain 133.

Cones 115 and 116 are moved back and forth on shaft 111 in any desired manner. However, this is preferably done by hydraulic means. This may be accomplished by a hydraulic cylinder 138 pivotally mounted at one end at 139 on a support 140 projecting upwardly from the transmission. This cylinder has a piston rod 142 projecting from its opposite end which is connected to the upper end of lever 143 pivotally mounted at 144. The lower end of this lever is in the form of a yoke 145 which spans sleeve 118 and is pivotally connected thereto at 146. In and out movement of piston rod 142 pivots lever 143 to slide the clutch cones along the shaft or, in other words, to engage and disengage the two clutches.

Shaft 126 is journalled in bearings 150 on base 11 and has a sprocket 151 fixedly mounted on its outer end which is connected by a chain 152 to another sprocket 153 freely mounted on axle 15 and connected to wheel 16. With this arrangement, clutches 128 and 129 connect this wheel to motor 105 for rotation in opposite directions.

A similar arrangement is provided for wheel 17. Friction clutches 156 and 157 are provided in transmission 110 causing shaft 111 to rotate a shaft 159 in opposite directions. The latter two clutches are controlled by a lever 161 which is moved by a hydraulic cylinder 162 pivotally mounted at 163 on support 140.

Shaft 159 is journalled in bearings 166 mounted on base 11, and has a sprocket 168 fixedly mounted on its outer end which is connected by chain 169 to another sprocket 170 freely mounted on axle 13 and connected to wheel 17.

Figure 6 diagrammatically illustrates control valves 175, 177, 179 and 181 for cylinders 76, 138, 162 and 34, respectively. It also includes a control valve 183 for hydraulic motor 50. Each control valve directs hydraulic fluid under pressure from pump 100 to its unit and returns the fluid to reservoir 102. This is an ordinary hydraulic system and does not require any detailed description herein. In Figures 1 and 2 these control valves are shown mounted on the top of outer section 47 of boom 42 near the inner or pivot end thereof. A seat 184 may be provided at this end of the vehicle near the top of post 24 for an operator where he will be close enough to be able to reach these valves. However, one of the main features of this invention is that an operator standing on platform 64 can control the entire action of the vehicle. It is, therefore, necessary to provide means to enable these control valves to be operated by a person on the platform. Control valves 175, 177, 179, 181 and 183 are operated by rotating long rods 185, 187, 189, 191 and 193, respectively. These rods are extensible and the two sliding sections thereof are made to rotate together in any suitable manner. For example, the two sections of each rod may be made square in cross section, as shown in Figure 3. These rods extend the length of boom 42 and their opposite ends are journalled in a block 198 mounted on top of the outer boom section 48. A handle 202 projects upwardly from each of these rods near the control valves, and another handle 203 projects upwardly from each of these rods near block 198, the latter handles being quite close to platform 64.

The operation of orchard vehicle 10 is very simple. A person standing on platform 64 can easily reach any of the handles 203 to manipulate the vehicle and its different parts. Movement of these handles operates the control valves 175, 177, 179, 181 and 183. Valve 175 causes cylinder 76 to raise and lower the boom; valves 177 and 179 operate cylinders 138 and 162 to cause wheels 16 and 17 to rotate in either direction independently of each other or to stop movement; valve 181 causes cylinder 34 to rotate post 24 around its vertical axis, thereby swinging boom 42 in a substantially horizontal plane; and valve 183 causes hydraulic motor 50 to extend and retract boom 42. As previously stated, the platform is maintained substantially horizontal during vertical movement of the boom.

The vehicle may be moved from place to place by the operator on platform 64, or he may wish to sit on seat 184 at this time. He can then manipulate the vehicle by operating levers 202. If the person on the platform does not wish to manipulate the vehicle, another operator may sit in seat 184.

Figure 5 illustrates a fork attachment 210 for platform 64. This attachment has prongs 212 connected at one end to a support 213 which, in turn, is pivotally mounted at 214 at its upper end to brackets 215 on the underside of platform 64. A hydraulic cylinder 218 is pivotally mounted at 219 on brackets 220 on the underside of the platform, and this cylinder has a piston rod 222 projecting from its opposite end and connected by pin 223 to support 213 near the lower end thereof. Cylinder 218 is operatively connected by flexible pipes 226 to a control valve 227 mounted on the side wall 65 of the platform near the top thereof, said valve having an operating handle 228 projecting therefrom. Flexible pipes 230 extend from this control valve to the hydraulic system, as clearly shown in Figure 6.

An operator on platform 64 may by manipulating control valve 227 cause cylinder 218 to swing the fork prongs 212 back and forth around the pivot point 214. He can move the fork arrangement up and down or back and forth horizontally by manipulating the platform in the manner described above.

What I claim as my invention is:

1. An orchard vehicle comprising a base on wheels, a vertical post rotatably mounted on the base near an end thereof, means on the base and connected to the post to rotate the latter about its vertical axis, an extensible boom pivotally mounted at its inner end on the post for vertical movement and normally extending over the base, power means mounted on the boom and connected thereto to extend and retract said boom, a support carried by the post and extending under the boom, means on the support and connected to the boom for swinging said boom up and down, a platform pivotally mounted on the outer end of the boom, an extensible shaft extending the length of the boom and rotatably supported thereby, a drum fixedly mounted on each end of the shaft, a cable connected to the post above the boom and wound on the adjacent drum, and another cable connected to the platform above the pivot thereof and wound on the other drum, whereby upward and downward movement of the boom causes the drums to rotate together respectively in opposite directions to maintain the platform in a substantially horizontal plane during both movements.

2. An orchard vehicle comprising a base on wheels, a vertical post rotatably mounted on the post near an end thereof, actuating means on the base and connected to the post for rotating said post around its vertical axis, a boom pivotally mounted at its inner end on the post for vertical movement and normally extending over the base, a support carried by the post and extending under the boom, power means on the support and connected to the boom for swinging the latter up and down, a platform pivotally mounted on the outer end of the boom, a power source on the base and reversible driving means for the base wheels and operated by the power source characterized by means connected to the platform for maintaining it in a substantially horizontal plane when the boom is swung vertically, a seat mounted on the upper end of the post near and clear of the inner end of the boom, a plurality of controls mounted on the boom near the inner end thereof and the seat, there being a control for and operatively connected to each of the actuating means, power means and driving means, and an operating rod on the boom connected to and extending from each control and terminating near the platform whereby an operator on the seat or the platform can operate the controls selectively to cause the boom to swing vertically and horizontally and the vehicle base to move in opposite directions.

3. An orchard vehicle comprising a base having a caster wheel at one end and a drive wheel at each side of its opposite end, a vertical post rotatably mounted on the base near the caster wheel end thereof, actuating means on the base and connected to the post for rotating said post around its vertical axis, a boom formed of inner and outer telescopic sections normally extending over the base, one of said boom sections being pivotally mounted at the end thereof remote from the other section on the post for vertical movement, a reversible motor on the boom, means connected to the boom sections and the motor for moving said sections relative to each other to extend and retract the boom during operation of the motor, a support carried by the post and extending under the boom, power means on the support and connected to the boom for swinging the latter up and down, a platform pivotally mounted on the outer end of the boom, a power source on the base and reversible driving means for each of said drive wheels and operated by the power source independently of the other drive wheel characterized by means connected to the platform for maintaining it in a substantially horizontal plane when the boom is swung vertically, a seat mounted on the upper end of the post near and clear of the inner end of the boom, a plurality of controls mounted on the boom near the inner end thereof and the seat, there being a control for and operatively connected to each of the actuating means, boom motor, power means and driving means, and an extensible operating rod on the boom connected to an extending from each control and terminating near the platform whereby an operator on the seat of the platform can operate the controls selectively to cause the boom to extend, retract and swing vertically and horizontally and the vehicle base to move or swing in any direction.

4. An orchard vehicle comprising a base on wheels, a vertical post rotatably mounted on the base near an end thereof, actuating means on the base and connected to the post for rotating said post around its vertical axis, a boom pivotally mounted at its inner end on the post for vertical movement and normally extending over the base, a support carried by the post and extending under the boom, power means on the support and connected to the boom for swinging the latter up and down, a platform pivotally mounted on the outer end of the boom and reversible driving means for the base wheels and operated by the power source characterized by a seat mounted on the upper end of the post near and clear of the inner end of the boom, a plurality of controls mounted on the boom near the inner end thereof and the seat, there being a control for and operatively connected to each of the actuating means, power means and driving means and an extensible operating rod on the boom connected to and extending from each control and terminating near the platform whereby an operator on the seat or the platform can operate the controls selectively to cause the boom to swing vertically and horizontally and the vehicle base to move in opposite directions and means connected to the platform for maintaining it in a substantially horizontal plane when the boom is swung vertically, said platform levelling means comprising an extensible shaft extending the length of the boom and rotatably supported thereby, a drum fixedly mounted on each end of the shaft, a cable connected to the post above the boom and wound on the adjacent drum and another cable connected to the platform above the pivot thereof and wound on the other drum whereby upward and downward movement of the beam causes the drums to rotate together respectively in opposite directions to maintain the platform in a substantially horizontal plane during both movements.

References Cited in the file of this patent

UNITED STATES PATENTS

| | | |
|---|---|---|
| 1,035,570 | Marshall et al. | Aug. 13, 1912 |
| 2,627,560 | Eitel | Feb. 3, 1953 |
| 2,666,417 | Harsch | Jan. 19, 1954 |
| 2,670,965 | Ritzel | Mar. 2, 1954 |
| 2,672,377 | Werner | Mar. 16, 1954 |
| 2,674,500 | Hukari | Apr. 6, 1954 |
| 2,724,599 | Knapp | Nov. 22, 1955 |
| 2,754,087 | Johnson | July 10, 1956 |

FOREIGN PATENTS

| | | |
|---|---|---|
| 992,644 | France | July 11, 1951 |
| 1,101,852 | France | Oct. 11, 1955 |